(12) United States Patent
Franz et al.

(10) Patent No.: US 11,504,647 B2
(45) Date of Patent: Nov. 22, 2022

(54) PROCESS FOR TRANSFER OF A METHOD FROM A STARTING SYSTEM TO A TARGET SYSTEM IN LIQUID CHROMATOGRAPHY

(71) Applicant: DIONEX SOFTRON GMBH, Germering (DE)

(72) Inventors: Holger Franz, Woerthsee (DE); Thomas Wachinger, Altomuenster (DE); Christian Schmidt, Gilching (DE)

(73) Assignee: Dionex Softron GMBH, Germering (DE)

( * ) Notice: Subject to any disclaimer, the term of this patent is extended or adjusted under 35 U.S.C. 154(b) by 629 days.

(21) Appl. No.: 15/229,553

(22) Filed: Aug. 5, 2016

(65) Prior Publication Data

US 2017/0038352 A1 Feb. 9, 2017

(30) Foreign Application Priority Data

Aug. 5, 2015 (DE) .................... 10 2015 112 900.0

(51) Int. Cl.
*B01D 15/16* (2006.01)
*B01D 15/14* (2006.01)
*G01N 30/86* (2006.01)
*G01N 30/34* (2006.01)

(52) U.S. Cl.
CPC .......... *B01D 15/166* (2013.01); *B01D 15/14* (2013.01); *B01D 15/161* (2013.01); *G01N 30/86* (2013.01); *G01N 30/34* (2013.01)

(58) Field of Classification Search
CPC ............ C12N 15/8245; C12N 15/8251; C12N 15/8201; C12N 15/8242; C12N 15/8247; C12Q 1/6895; C12Q 2600/13; C12Q 2600/156; C07K 14/415; B01D 15/14; B01D 15/161; B01D 15/166; G01N 30/86; G01N 30/34
See application file for complete search history.

(56) References Cited

U.S. PATENT DOCUMENTS

| | | | |
|---|---|---|---|
| 5,405,432 | A | 4/1995 | Snyder et al. |
| 5,827,946 | A | 10/1998 | Klee et al. |
| 5,987,959 | A | 11/1999 | Klee et al. |
| 2003/0110000 | A1 | 6/2003 | Quimby et al. |
| 2009/0288473 | A1 | 11/2009 | Suzuki et al. |

(Continued)

FOREIGN PATENT DOCUMENTS

| | | | |
|---|---|---|---|
| DE | 10255114 A1 | | 6/2003 |
| DE | 20201410262 U1 | * | 3/2014 |

(Continued)

*Primary Examiner* — Latosha Hines

(57) ABSTRACT

A process for transferring a method from a starting system to a target system in liquid chromatography, in particular in high performance liquid chromatography, is described. A first chromatogram of the method carried out on the starting system is available or determined. The method developed for the starting system is carried out on the target system without any change in its physical parameters, and a second chromatogram is thereby determined. The two chromatograms of the starting system and the target system are compared, and measures for adjusting the physical system parameters of the target system are derived from the deviations.

20 Claims, 2 Drawing Sheets

(56) References Cited

U.S. PATENT DOCUMENTS

| | | | |
|---|---|---|---|
| 2011/0209766 A1* | 9/2011 | Witt | G01N 30/34 |
| | | | 137/1 |
| 2012/0096919 A1* | 4/2012 | Choikhet | G01N 30/88 |
| | | | 73/1.02 |
| 2012/0285223 A1 | 11/2012 | Andrews et al. | |
| 2013/0228513 A1* | 9/2013 | Andrews | B01D 15/10 |
| | | | 210/635 |
| 2015/0076068 A1 | 3/2015 | Andrews et al. | |

FOREIGN PATENT DOCUMENTS

| | | | | |
|---|---|---|---|---|
| DE | 202014101262 U1 * | 4/2014 | | B01D 15/14 |
| DE | 202014101262 U1 | 5/2014 | | |
| WO | WO-2011091224 A1 * | 7/2011 | | G01N 30/04 |

* cited by examiner

PROCESS FOR TRANSFER OF A METHOD FROM A STARTING SYSTEM TO A TARGET SYSTEM IN LIQUID CHROMATOGRAPHY

CROSS-REFERENCE TO RELATED APPLICATION

This application claims the priority benefit under 35 U.S.C. § 119 to German Patent Application No. DE 10 2015 112 900.0, filed on Aug. 5, 2015, the disclosure of which is incorporated herein by reference.

FIELD OF THE INVENTION

The invention relates to the field of liquid chromatography, in particular high-performance liquid chromatography (HPLC).

BACKGROUND

A chromatographic separation process includes pumping a substance to be analyzed with a solvent, which is the mobile phase (also known as an "eluent"), through a so-called separation column containing the stationary phase. If a component of the substance to be analyzed interacts strongly with the stationary phase, then it remains in the column for a relatively long period of time. However, if it interacts weakly with the stationary phase, it leaves the column quickly. The constituents of the substance appear at different times (retention times) at the end of the separation column, where they then can be detected with a suitable detector, depending on the strength of these interactions.

To achieve a complete and reproducible separation, a separate method must be developed for any more complex substance mixture, especially in the gradient method. Even minor deviations from a method may cause a change in selectivity. The goal of developing a method is to obtain a chromatogram in which all the peaks are separated as well as possible. Another goal is to keep the distance between the substances small in order to keep the duration of a separation process as short as possible and thus be able to achieve a high sample throughput.

Problems may occur in scale-up, i.e., transfer, of the developed method to an HPLC system of a different design. The systems usually differ in several parameters such as the gradient delay volume (GDV), the type of column temperature control, dispersion properties, so that the gradient profile and selectivity of the method may vary. Therefore, retention times can change and the chromatograms of the two systems may no longer be identical. The invention therefore relates to the scale-up of methods to different HPLC systems, so that the chromatographic results remain as similar as possible in execution of the same method.

U.S. 2011/0209766 A1 thus describes a method transfer in which the physical system parameters are detected by the starting system and, together with the method developed for the starting system, a real operation mode is calculated. The term "real operation mode" here is understood to mean that, for example, the gradient is somewhat blurred due to the gradient delay volume of the system. See FIG. 1 (see U.S. 2011/0209766 A1, FIG. 3).

As the next step, the physical system parameters of the target system must be detected. The method for the target system must then be calculated from the real method from the starting system and the physical system parameters of the target system. See FIG. 2 (U.S. 2011/0209766 A1).

Since the newly calculated method is carried out on the target system, the same chromatogram is now created as that on the starting system.

However, this method functions only when the system data of the HPLC systems is stored in the software. It is a disadvantage that this method requires an extensive collection and maintaining the system data archives.

U.S. 2013228513 A1 describes the operation of the starting system and the target system with a defined gradient slope for transfer of the method and recording of the system response. See FIG. 3 (see U.S. 2013228513 A1, FIG. 1).

Now an equation for the starting system will be calculated, describing the system response as a function of the gradient slope established. An equation is also calculated for the target system.

Then the required gradient slope for the target system is calculated from these equations in order to obtain the same system response.

This gradient slope is then used for the method in operation of the target system.

In this method, test runs must be carried out on the target system and the starting system in order to obtain the jump response. The time-intensive process of determining the jump responses is a disadvantage.

Another previously unknown possibility of scale-up of a method without resulting in any major change in the chromatograms will be possible, namely obtaining the physical parameters, such as the gradient delay volume (GDV—gradient delay volume or dwell volume) to the old system. This could be achieved, for example, by adapting the size of the mixer or by changing the volume of the cylinder in a dosing device (metering device) of a sample charger, which is proposed in DE 20 2014 101 262 U1.

SUMMARY

Figure 1:
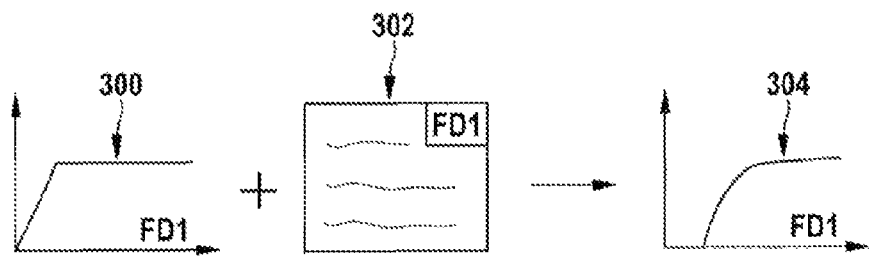
FIG. 1: 300—developed method; 302—parameters of the starting system; 304—real method of the starting system.
Figure 2:
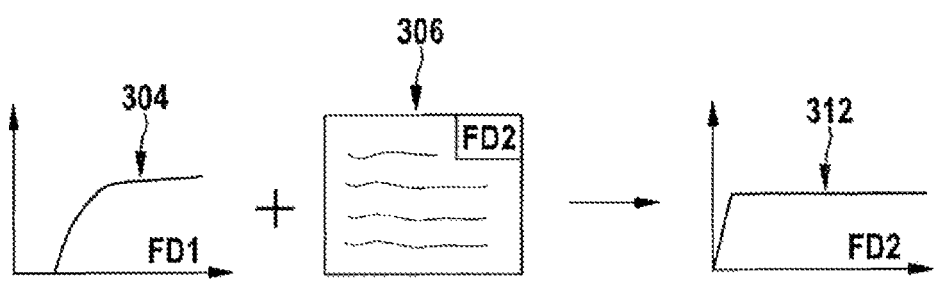
FIG. 2: 304—real method from the starting system; 306—parameters of the target system; 312—method for the target system.
Figure 3:
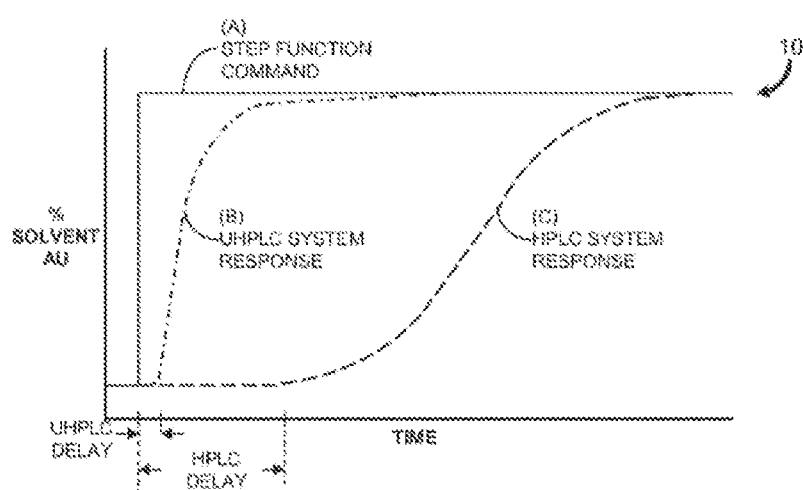
FIG. 3: A—method with which the system is operated; B and C—real operation mode as it appears on the system.

The present invention is therefore based on the object of creating a method and a system and/or an automatic sampler, which will permit a transfer of chromatographic methods from various HPLC systems to other HPLC systems with chromatographic methods, so that chromatographic results always remain comparable or even identical. Another object of the invention is to be able to determine the physical parameters and/or the change in physical parameters of the target system automatically (computer assisted).

This object is achieved according to the invention in that the method developed for the starting system and the chromatographic result are transferred to the target system for the method transfer. In this transfer, the method developed for the starting system is carried out on the target system (without any change in its physical parameters) and/or applied there, and the chromatogram thereby determined is preferably stored. The chromatogram of the target system obtained in this way is compared below with the existing chromatogram or with the chromatogram that has been ascertained for the starting system (result of the method carried out on the starting system).

From the comparison of these two chromatograms (of the starting system and of the target system), differences (graphical deviations, deviations in the time axis and/or amplitude) are determined and from them measures are derived for altering the physical parameters of the target system.

Then if a deviation in the X axis (time axis) of the chromatogram is detected, this is often a result of the different GDVs of the systems. Thus, in a preferred embodiment of the invention, the required ΔGDV for the target system is calculated from the time shift (peak in chromatogram too late or too early on the time axis or X axis) and possibly also the flow rate and is adjusted on the basis of a change in volume, for example, on a volume adjusting device, such as that described in DE 20 2014 101 262 U1 in particular on the basis of the cylinder of the metering device.

Furthermore, with the reduction in the GDV, the transfers become sharper and are more angular in the chromatogram. Here again, the GDV (in the case of transfers that are too sharp) is increased or decreased accordingly (when the transfers are not sharp enough). This results from the fact that more mixed volume is created automatically due to the higher GDV, but this blurs the gradient.

Another possibility for adapting a time deviation is to alter and/or adjust the injection time. The retention times can be varied through this measure.

When there are deviations in the chromatogram not caused by the GDV (time deviation and differences in sharpness) or the injection time (time deviation), an adjustment can be made in another embodiment of the invention by adapting the type of thermostatic control of the target column oven to that of the initial column oven as a measure or altering it in accordance with the deviation.

At an elevated temperature in comparison with the starting system (preferably at a constant temperature), the viscosity of the eluent and the sample becomes lower (more fluid), so that the distances between peaks in the chromatogram are reduced (compression). At a lower temperature, preferably constant, the viscosity of the eluent and of the sample increases (becomes thicker), so that the distances between peaks in the chromatogram become greater (spreading). However, this is also conceivable with a change in the gradient slope.

In addition, it is conceivable to alter the gradient (change in proportion of solvent composition, preferably with the same solvents).

In a preferred embodiment, the measures for changing the physical (system) parameters of the target system are implemented iteratively and preferably automatically by performing a successive approximation of the chromatograms by readjusting the physical parameters. To control such a sequence, corresponding analysis and control units including memory units and program means may be used. In particular, a system which can also automatically improve its algorithm is conceivable (fuzzy logic, artificial intelligence, etc.).

According to the invention, the chromatogram can be adjusted automatically or by means of a manual or semiautomatic shifting of peaks for adjustment of the chromatogram created by the target system to the original chromatogram. The goal here is primarily an adjustment by means of a change in the GDV (and/or introducing a corresponding ΔGDV) so that early eluting peaks are typically made to coincide.

However, additional changes within the chromatogram can be attributed according to the invention to an altered selectivity which can be influenced through the technical type of column from a static regulation.

DETAILED DESCRIPTION OF EMBODIMENTS

The method according to the invention is explained in greater detail below on the basis of an exemplary embodiment.

In a particularly preferred embodiment of the invention, the following process sequence of an existing method of an output system (including a pre-existing chromatogram or one that is newly determined) is carried out:

1. Transfer of the method from the starting system to the target system
2. Transfer of the chromatogram created on the starting system to the target system
3. Carrying out the transferred method on the target system (without any change in the physical parameters of the target system)
4. Regarding the (resulting) chromatogram by the target system
5. Comparing the chromatograms of the starting system with the target system
6. Evaluating the differences between the chromatograms
7. Deriving measures
8. Changing the physical parameters of the target system, so that the chromatograms become identical The differences between the chromatograms are evaluated in a computer-assisted process in which the change over time (with spreading or compression) and/or the change in the type and/or form (flatter, broader or more pointed, higher) of identical and/or similar peaks in the chromatograms is evaluated. In addition to a comparison by "superimposing" the chromatograms and assigning equivalent peaks as well as ascertaining changes, it is also possible here to make use of the fact that, in a transfer of the method, equivalent peaks, i.e., peaks caused by a certain component of a sample, can also be varied in form and/or occurrence in time but the area (integral) under the peak remains the same.

For example, if now a deviation in the X axis (time axis) of the chromatogram is detected, this is often a result of the different GDVs of the systems in gradient elution. Thus, the required ΔGDV for the target system is calculated from the flow rate and the shift in time and is adjusted by means of the change in volume on the cylinder of the metering device. If it is necessary to adjust the GDV beyond the volume of the cylinder, this can take place by changing the sample injection time.

If a peak occurs too early (shifted to the left on the time axis) in the chromatogram of the target system in comparison with the chromatogram of the starting system or if it is too late (shifted to the right on the time axis), this can be compensated by a suitably calculated ΔGDV (as a function of flow rate).

If a peak occurs too early, then the GDV should be increased for compensation (i.e., by a corresponding ΔGDV). If a peak occurs too late, then the GDV (or a corresponding ΔGDV) should be reduced for compensation.

For example, if it is found that a flow rate of 1 mL/s a peak occurs 3 too late, then the GDV would be reduced by 3 mL (ΔGDV=−3 mL) to compensate for this time lag.

In addition, an adjustment of the injection time is also conceivable to be able to vary the retention times. A time deviation between the chromatograms can also be corrected in this way. A combination of an increase in the GDV and a change in injection time is necessary, for example, if the gradient is too blurred (flattened and broadened peak) due to the adjustment in GDV. It is therefore also conceivable in a first step to adjust the GDV to the extent that the sharpness of the gradient and the peak is sufficient or even matches and to change the injection time in a second step, so that the offset in the X axis (over time) is corrected in this way. Of course it is also conceivable to perform the aforementioned steps in the reverse order.

An increase or reduction in GDV can occur, for example, by means of a volume adjusting device, in particular in the form of a metering device, such as that known from DE 20 2014 101 262 U1. To avoid repetition, reference is made explicitly to the full disclosure content of DE 20 2014 101 262 U1.

In the event of deviations in the chromatogram not caused by the GDV, an adjustment may be made by approximating matching the type of thermostatic control (type of active pickling or passive damping) of the target column oven to that of the initial column oven or altering it accordingly to achieve the desired temperature profile (during a sample run) and/or a temperature profile for adjusting the chromatograms. It is also conceivable here to alter the temperature (preferably constant) of the target column oven accordingly. If the (different) peaks are too far apart (too spread out or drawn), for example, then compression of the peaks can be achieved by raising the column temperature in the column oven (reduction in viscosity). Stretching of the peaks takes place in the opposite order accordingly. The same is also possible when there is a change in the gradient slope, because the chromatogram is compressed, when there is an increase in the gradient slope (in other words, the ability of the sample to dissolve in the solvent mixture increases over time) and conversely, the chromatogram is spread out when there is a reduction in gradient slope.

An iterative method is also conceivable, in that a successive accommodation of the chromatograms takes place by readjustment of the physical parameters. The system here could also automatically improve its algorithm (self-learning system, implemented iteratively, for example, or through other forms of "artificial intelligence").

The method according to the invention offers the advantage in comparison with known methods that each individual method here is transferred and adjusted with precision automatically, semiautomatically or at least partially manually.

In addition, it is not necessary to collect system parameters of all the HPLC systems and/or to ascertain a jump response of the two transferring systems in advance.

The system parameters can be optimized by an iterative process until the desired result is achieved.

In a preferred embodiment of the invention, the original gradient profile is not altered. Only the physical parameters here are adapted to the original system, so that the same method also brings the same result on the new system. This is important in transfer of certified methods, for example.

What is claimed is:

1. A process for transfer of a method from a starting system to a target system in liquid chromatography, the process comprising:
    (a) providing a first chromatogram of the method carried out on the starting system;
    (b) performing the method of the starting system on the target system without any change in physical parameters and obtaining a second chromatogram;
    (c) comparing the first chromatogram of the starting system and the second chromatogram of the target system to determine a deviation, and
    (d) calculating a change in at least one of the physical parameters of the target system based on the deviation,
    (e) performing the method developed for the starting system on the target system with the calculated change in the at least one physical parameter based on the deviation and obtaining a third chromatogram;
    (f) comparing the first chromatogram of the starting system and the third chromatogram of the target system to determine a successive deviation,
    (g) iteratively adjusting the at least one physical parameter of the target system derived from the successive deviation, and
    (h) wherein comparing of the two chromatograms of the starting system and the target system, further comprises:
        detecting corresponding peaks on the first chromatogram and the second chromatogram with a computer; and
        calculating a displacement vector with the computer, in which the displacement vector is a distance over time of the detected corresponding peaks.

2. The process according to claim 1, in which the deviation comprises a time shift for a peak in the second chromatogram compared to the first chromatogram, in which the physical parameters comprise a gradient delay volume, the process further comprising:
    calculating a change in the gradient delay volume based on the time shift.

3. The process according to claim 2, in which the physical parameters further comprise an injection time, the process further comprising:
    calculating a change in the injection time based on the time shift.

4. The process according to claim 1, in which the deviation comprises a time shift for a peak in the second chromatogram compared to the first chromatogram, in which the physical parameters comprise an injection time, the process further comprising:
    calculating a change in the injection time based on the time shift.

5. The process according to claim 1, in which the deviation comprises a time change between two peaks in the second chromatogram compared to a time change between two corresponding peaks in a first chromatogram, in which the physical parameters comprise a type of thermostatic regulation of a target column oven or a target column temperature, the process further comprising:
    calculating a change in the type of thermostatic regulation of the target column oven or the target column temperature based on the deviation.

6. The process according to claim 5, in which the time change between two peaks in the second chromatogram compared to the time change between two corresponding peaks in the first chromatogram comprises either a compression or a spreading.

7. The process according to claim 1, in which the deviation comprises a time change between two peaks in the second chromatogram compared to a time change between two corresponding peaks in a first chromatogram, in which the physical parameters comprise a gradient slope, the process further comprising:
    calculating a change in the gradient slope based on the deviation.

8. The process according to claim 1 further comprising:
    varying a gradient delay volume to adjust a sharpness of a gradient and a peak sharpness.

9. The process according to claim 8, in which the deviation comprises a time shift for a peak in the second chromatogram compared to the first chromatogram, in which the physical parameters comprise a gradient delay volume and an injection time, the process further comprising:
  after adjusting the peak sharpness, calculating a change in the gradient delay volume or the injection time based on the time shift.

10. The process according to claim 1, in that the physical parameter is derived from the displacement vector.

11. A process for transfer of a method from a starting system to a target system in liquid chromatography, the process comprising:
  (a) providing a first chromatogram of the method carried out on the starting system;
  (b) performing the method of the starting system on the target system without any change in physical parameters and obtaining a second chromatogram;
  (c) comparing the first chromatogram of the starting system and the second chromatogram of the target system,
  (d) calculating a change in at least one of the physical parameters of the target system,
  (e) performing the method developed for the starting system on the target system with the calculated change in the at least one physical parameter and obtaining a third chromatogram; and
  (f) comparing the first chromatogram of the starting system and the third chromatogram of the target system, including detecting corresponding peaks on the first chromatogram and the second chromatogram with a computer, and calculating a displacement vector with the computer, in which the displacement vector is a difference in height of the detected corresponding peaks.

12. The process according to claim 11, in which comparing the first chromatogram and the second chromatogram comprises determining a time shift for a peak in the second chromatogram compared to the first chromatogram, in which the physical parameters comprise a gradient delay volume, the process further comprising calculating a change in the gradient delay volume based on the time shift.

13. The process according to claim 12, in which the physical parameters further comprise an injection time, the process further comprising:
  calculating a change in the injection time based on the time shift.

14. The process according to claim 13, in which comparing the first chromatogram and the second chromatogram comprises determining a time shift for a peak in the second chromatogram compared to the first chromatogram, in which the physical parameters comprise an injection time, the process further comprising calculating a change in the injection time based on the time shift.

15. The process according to claim 11, in which comparing the first chromatogram and the second chromatogram comprises determining a time change between two peaks in the second chromatogram compared to a time change between two corresponding peaks in the first chromatogram, in which the physical parameters comprise a type of thermostatic regulation of a target column oven or a target column temperature, the process further comprising:
  calculating a change in the type of thermostatic regulation of the target column oven or the target column temperature based on the deviation.

16. The process according to claim 15, in which the time change between two peaks in the second chromatogram compared to the time change between two corresponding peaks in the first chromatogram comprises either a compression or a spreading.

17. The process according to claim 11, in which comparing the first chromatogram and the second chromatogram comprises determining a time change between two peaks in the second chromatogram compared to a time change between two corresponding peaks in the first chromatogram, in which the physical parameters comprise a gradient slope, the process further comprising calculating a change in the gradient slope based on the deviation.

18. The process according to claim 11 further comprising:
  varying a gradient delay volume to adjust a sharpness of a gradient and a peak sharpness.

19. The process according to claim 18, in which comparing the first chromatogram and the second chromatogram comprises determining a time shift for a peak in the second chromatogram compared to the first chromatogram, in which the physical parameters comprise a gradient delay volume and an injection time, the process further comprising:
  after adjusting the peak sharpness, calculating a change in the gradient delay volume or the injection time based on the time shift.

20. A process for transfer of a method from a starting system to a target system in liquid chromatography, the process comprising:
  (a) providing a first chromatogram of the method carried out on the starting system;
  (b) performing the method of the starting system on the target system without any change in physical parameters and obtaining a second chromatogram;
  (c) comparing the first chromatogram of the starting system and the second chromatogram of the target system,
  (d) calculating a change in at least one of the physical parameters of the target system,
  (e) performing the method developed for the starting system on the target system with the calculated change in the at least one physical parameter and obtaining a third chromatogram; and
  (f) comparing the first chromatogram of the starting system and the third chromatogram of the target system, including detecting corresponding peaks on the first chromatogram and the second chromatogram with a computer, and calculating a displacement vector with the computer, in which the displacement vector is a difference in shape of the detected corresponding peaks.

* * * * *